US012808343B2

(12) United States Patent
Ko

(10) Patent No.: US 12,808,343 B2
(45) Date of Patent: Nov. 24, 2026

(54) FUEL REFORMING SYSTEM OF DIESEL VEHICLE

(71) Applicants: Hyundai Motor Company, Seoul (KR); Kia Corporation, Seoul (KR)

(72) Inventor: Dong Seok Ko, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/230,684

(22) Filed: Jun. 6, 2025

(65) Prior Publication Data

US 2026/0139647 A1 May 21, 2026

(30) Foreign Application Priority Data

Nov. 18, 2024 (KR) ........................ 10-2024-0164575

(51) Int. Cl.
*F02M 31/04* (2006.01)

(52) U.S. Cl.
CPC ................................ *F02M 31/045* (2013.01)

(58) Field of Classification Search
CPC .................................................... F02M 31/045
USPC ............ 701/104; 123/1 A, 2, 3, 27 GE, 526, 123/DIG. 12
See application file for complete search history.

(56) References Cited

U.S. PATENT DOCUMENTS

| | | | | |
|---|---|---|---|---|
| 6,964,156 | B2 | 11/2005 | Liu et al. | |
| 7,823,570 | B2 | 11/2010 | Cracknell et al. | |
| 8,037,850 | B2 * | 10/2011 | Pursifull | F02D 41/3094 123/3 |
| 12,195,335 | B2 * | 1/2025 | Ko | B01D 53/047 |

FOREIGN PATENT DOCUMENTS

| | | | |
|---|---|---|---|
| JP | 2001-98949 | A | 4/2001 |
| KR | 10-1055719 | B | 8/2011 |
| KR | 10-2017-0122952 | A | 11/2017 |
| KR | 10-2020-0027238 | A | 3/2020 |
| KR | 10-2021-0066439 | A | 6/2021 |

* cited by examiner

*Primary Examiner* — Hai H Huynh
(74) *Attorney, Agent, or Firm* — Banner & Witcoff, Ltd.

(57) ABSTRACT

An apparatus of a vehicle may comprise a gas reformer configured to reform, through a diesel reforming reaction, a source gas into a first mixture gas containing hydrogen, wherein the source gas may comprise a diesel fuel and vapor, a water gas shift reactor configured to, based on the first mixture gas, generate a second mixture gas by converting carbon monoxide into carbon dioxide through an aqueous transition reaction, and a pressure swing adsorber configured to refine hydrogen in the second mixture gas and discharge the refined hydrogen to a diesel engine, a first heat exchanger provided between the gas reformer and the water gas shift reactor, a water supply device connected to the first heat exchanger, and a control circuit to control fuel and water flow rates and temperature.

20 Claims, 8 Drawing Sheets

FUEL REFORMING SYSTEM OF DIESEL VEHICLE

CROSS-REFERENCE TO RELATED APPLICATION

This application claims the benefit of priority to Korean Patent Application No. 10-2024-0164575, filed in the Korean Intellectual Property Office on Nov. 18, 2024, the entire contents of which are incorporated herein by reference.

TECHNICAL FIELD

The present disclosure relates to a fuel reforming system of a vehicle, and more particularly, to a fuel reforming system of a diesel vehicle that may reduce nitrogen oxides (NOx) and particulate matters (PM) that are discharged from a diesel engine.

BACKGROUND

The matters described in this Background section are only for enhancement of understanding of the background of the disclosure, and should not be taken as acknowledgment that they correspond to prior art already known to those skilled in the art.

Emissions from diesel vehicles may contain air pollutants, such as unburned hydrocarbons (HC), nitrogen oxides (NOx), and particulate matters (PM).

To reduce nitrogen oxides (NOx) and particulate matters (PM) that are relatively high emissions, among air pollutants in diesel vehicles, emission standards for certification at home and abroad continue to be strengthened.

As a result, in relation to PM emissions, a diesel particulate filter (DPF) that makes PM emissions close to zero may be mounted on a vehicle. In addition, a selective catalytic reduction (SCR) device having a high nitrogen oxide reduction effect may be used. A SCR may be a device that reduces nitrogen oxides generated during combustion of an engine by injecting urea water that is an aqueous ammonia solution into the engine.

Further, an exhaust gas recirculation (EGR) device may be used. An EGR may be a device that reduces nitrogen oxides by decreasing a combustion temperature in an engine by bypassing a portion of the exhaust gas through a bypass line and re-injecting it into the engine.

However, nitrogen oxides (NOx) may be effectively reduced by an EGR device, but it is challenging to simultaneously reduce particulate matters (PM) that generally have a trade-off relationship with nitrogen oxides due to a decrease in combustion temperature. For reducing exhaust emissions of diesel vehicles, post-treatment devices, improvement of engine bodies, and changes in intake/exhaust system structures may be considered.

As one of these considerations, using hydrogen as an additive for diesel engines, may reduce exhaust gases, such as PMs and CO2 in diesel engines.

Using hydrogen as an additive for diesel engines may improve the performance of diesel engines and reduce exhaust gases. However, it has a low density and explosive properties, so that there may be technical limitations and economic problems, such as production, transportation, and preservation of hydrogen.

As a way to address these problems, it is possible to manufacture a reformed hydrogen exhaust gas recirculation system that may improve fuel economy and exhaust performance by mounting a catalyst reformer that directly produces hydrogen on an EGR device, and reforming and producing hydrogen. Because an amount of hydrogen supplied from such a reforming reactor is limited, it may be beneficial to control the amount of the supplied hydrogen and to control an internal combustion temperature of the diesel engine.

SUMMARY

The present disclosure has been made to solve the above-mentioned problems.

According to the present disclosure, an apparatus of a vehicle, the apparatus may comprise a gas reformer configured to reform, through a diesel reforming reaction, a source gas into a first mixture gas containing hydrogen, wherein the source gas may comprise a diesel fuel and vapor, a water gas shift reactor configured to, based on the first mixture gas, generate a second mixture gas by converting carbon monoxide in the first mixture gas into carbon dioxide through an aqueous transition reaction, and a pressure swing adsorber (PSA) configured to refine hydrogen in the second mixture gas and discharge the refined hydrogen to a diesel engine of the vehicle, a first heat exchanger configured to control a temperature of the first mixture gas and a temperature of the second mixture gas through heat exchange with water, wherein the first heat exchanger is provided between the gas reformer and the water gas shift reactor, a water supply device, connected to the first heat exchanger to supply water, and configured to supply water having passed through the first heat exchanger to the gas reformer, and a control circuit configured to control, a flow rate of the diesel fuel supplied to the gas reformer, a flow rate of the water supplied from the water supply device through the first heat exchanger, and an internal temperature of the gas reformer.

The apparatus may further comprise a heating device configured to supply reaction heat to the gas reformer.

The apparatus may further comprise a water separator, provided between the water gas shift reactor and the PSA, and configured to separate the water from the second mixture gas having passed through the water gas shift reactor.

The apparatus may further comprise a second heat exchanger, provided between the water supply device and the first heat exchanger, configured to lower a temperature of the water flowing to the first heat exchanger.

The apparatus may further comprise a cooler, provided between the water gas shift reactor and the water separator, configured to lower a temperature of the second mixture gas before water is separated from the second mixture gas by the water separator.

The apparatus, wherein the control circuit is further configured to, control an amount of diesel fuel required by the diesel engine, control the internal temperature of the gas reformer based on whether a temperature of exhaust gas supplied to the gas reformer is within a preset operating range, control a temperature of the second mixture gas by adjusting a flow rate of the water supplied from the water supply device to the water gas shift reactor, and control a flow rate of water supplied to the gas reformer.

The apparatus, wherein the control circuit is further configured to, select an input mode for controlling a flow rate of the diesel fuel, and based on a selected input mode being an automatic mode and information related to the flow rate of the diesel fuel from an engine control circuit of the vehicle, determine the flow rate of the diesel fuel.

The apparatus, wherein the control circuit is further configured to, based on the temperature of exhaust gas supplied to the gas reformer being within the preset operating range, raise an internal temperature of the gas reformer, and based on the temperature of exhaust gas supplied to the gas reformer being outside the preset operating range, discharge the exhaust gas from the gas reformer.

The apparatus, wherein the control circuit is further configured to, select an input mode for controlling the flow rate of the water, and based on a selected input mode being an automatic mode and an amount of the diesel fuel supplied to the gas reformer, determine the flow rate of the water.

The apparatus, wherein the control circuit is further configured to control a flow rate of the exhaust gas supplied to the gas reformer.

According to the present disclosure, an apparatus of a vehicle, the apparatus may comprise a processor, and a memory storing at least one instruction that, when executed by the processor communicating with the memory, is configured to cause the apparatus to, control, based on an operating state of an engine of the vehicle, a flow rate of fuel for the engine, control, based on the flow rate of the fuel, a flow rate of water, adjust, based on the controlled flow rate of the fuel and the controlled flow rate of the water, a temperature of the diesel fuel and a temperature of the water, generate a hydrogen-containing gas by reforming the temperature-adjusted fuel and the temperature-adjusted water, and supply the generated hydrogen-containing gas to the engine of the vehicle.

The apparatus, wherein the at least one instruction, when executed by the processor communicating with the memory, is configured to cause the apparatus to control, based on a fuel amount corresponding to the operating state of the engine, the flow rate of the fuel in an automatic mode.

The apparatus, wherein the at least one instruction, when executed by the processor communicating with the memory, is configured to cause the apparatus to control, based on an operator input, the flow rate of the fuel in a manual mode.

The apparatus, wherein the at least one instruction, when executed by the processor communicating with the memory, is configured to cause the apparatus to determine the flow rate of the water based on the flow rate of the fuel, and wherein the flow rate of the water is determined as a greater value between a predetermined setpoint value and a measured process variable value.

The apparatus, wherein the at least one instruction, when executed by the processor communicating with the memory, is configured to cause the apparatus to, based on a temperature of exhaust gas supplied for the reforming being within a predetermined range, adjust the temperature of the diesel fuel and the temperature of the water by activating a heating device to increase the temperature of the fuel and the temperature of the water.

The apparatus, wherein the at least one instruction, when executed by the processor communicating with the memory, is configured to cause the apparatus, based on a temperature of exhaust gas supplied to the gas reformer exceeding a predetermined range, to adjust the temperature of the fuel and the temperature of the water by discharging the exhaust gas through a bypass path of the engine.

The apparatus, wherein the at least one instruction, when executed by the processor communicating with the memory, is configured to cause the apparatus to generate the hydrogen-containing gas by performing a water gas shift reaction after performing a steam reforming reaction.

The apparatus, wherein the at least one instruction, when executed by the processor communicating with the memory, is configured to cause the apparatus to cool, via a heat exchanger, the water before the water is supplied for the reforming.

The apparatus, wherein the at least one instruction, when executed by the processor communicating with the memory, is configured to cause the apparatus to purify the hydrogen-containing gas by separating water and carbon dioxide from the hydrogen-containing gas using pressure swing adsorption.

The apparatus, wherein the at least one instruction, when executed by the processor communicating with the memory, is configured to cause the apparatus to control, via a heat exchange using a reforming byproduct gas, a temperature of the water before the water is supplied for the reforming.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
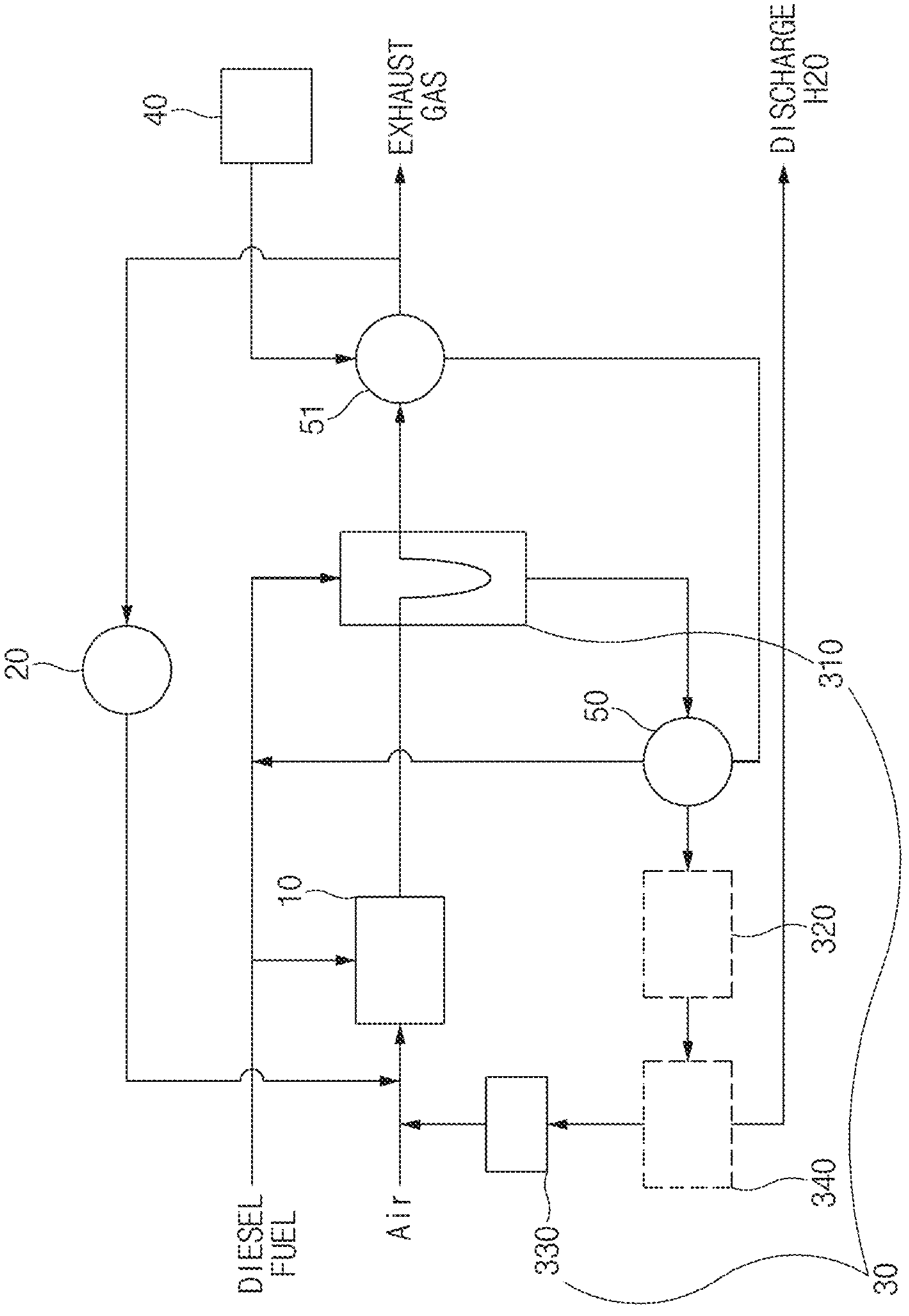
FIG. 1 shows an example of a schematic configuration of a fuel reforming system for a diesel vehicle according to an example of the present disclosure.

Hereinafter, some examples of the present disclosure will be described in detail with reference to the accompanying drawings. In adding reference numerals to the components of the drawings, it should be noted that the same components have the same numerals as possible even when they are illustrated on different drawings. In describing examples of the present disclosure, detailed descriptions associated with well-known functions or configurations will be omitted if they may make subject matters of the present disclosure unnecessarily obscure.

Furthermore, in describing components of examples of the present disclosure, the terms first, second, A, B, (a), (b), and the like may be used herein. These terms are only used to distinguish one component from another component, but do not limit the corresponding components irrespective of the nature, order, or priority of the corresponding components. When it is described that a certain component is "connected to", "coupled to" or "electrically connected to" a second component, it should be understood that the component may be directly connected or electrically connected to the second component, but a third component may be "connected", "coupled" or "electrically connected" between the components.

For purposes of this application and the claims, using the exemplary phrase "at least one of: A; B; or C" or "at least one of A, B, or C," the phrase means "at least one A, or at least one B, or at least one C, or any combination of at least one A, at least one B, and at least one C. Further, exemplary phrases, such as "A, B, or C", "at least one of A, B, and C", "at least one of A, B, or C", etc. as used herein may mean each listed item or all possible combinations of the listed items. For example, "at least one of A or B" may refer to (1) at least one A; (2) at least one B; or (3) at least one A and at least one B.

The term "module" or "unit" used in the specification means a software and/or hardware component, and the "module" or "unit" performs certain operations/functions/roles. However, the "module" or "unit" is not construed as being limited to software or hardware. The "module" or "unit" may be configured to be in an addressable storage medium or to execute one or more processors. Therefore, as an example, the "module" or "unit" may include at least one of components such as software components, object-oriented software components, class components, and task components, processes, functions, attributes, procedures, sub-routines, segments of program codes, drivers, firmware, micro-codes, circuits, data, databases, data structures, tables, arrays, or variables. Functions provided in the components, "modules", or "units" may be combined into a smaller number of components, "modules", or "units" or further divided into additional components, "modules", or "units".

In the present disclosure, the "module" or "unit" may be realized as a processor and a memory. The "processor" should be widely construed to include a general-purpose processor, a central processing unit (CPU), a microprocessor, a digital signal processor (DSP), a microcontroller, a state machine, or the like. In some environments, the "processor" may refer to an application-specific integrated circuit (ASIC), a programmable logic device (PLD), or a field-programmable gate array (FPGA), and the like. For example, the "processor" may refer to a combination of processing devices such as a combination of a DSP and a microprocessor, a combination of a plurality of microprocessors, a combination of one or more microprocessors combined with a DSP core, or any other such combination. Moreover, the "memory" should be widely construed to include any electronic component capable of storing electronic information. The "memory" may refer to various types of processor-readable medium such as a random access memory (RAM), a read only memory (ROM), a non-volatile random access memory (NVRAM), a programmable read only memory (PROM), an erasable programmable read only memory (EPROM), an electrically erasable programmable read only memory (EEPROM), a flash memory, a magnetic or optical data storage device, and registers. When the processor can read information from a memory and/or record the information in the memory, the memory may be in a state of electronic communication with a processor. Memory integrated into a processor is in a state of electronic communication with the processor.

The one or more features described herein may be provided as a computer program stored in a computer-readable recording medium in order to be executed on a computer. The medium may either continuously store a computer-executable program or temporarily store the program for execution or download. Furthermore, the medium may be a variety of recording or storage means in the form of a single hardware device or multiple combined hardware devices, and is not limited to media directly connected to some computer system but may also be distributed across a network. Examples of such media include magnetic media such as a hard disk, a floppy disk, or a magnetic tape, optical recording media such as a CD-ROM or a DVD, magneto-optical media such as a floptical disk, and a ROM, RAM, or flash memory, among others, configured to store program instructions. Additional examples of such media include media or storage media that are managed by an app store that distributes applications or by various other sites or servers that provide or distribute software.

In a hardware implementation, processing units used for performing the techniques may be implemented within one or more ASICs, DSPs, digital signal processing devices, programmable logic devices, field-programmable gate arrays, processors, controllers, microcontrollers, microprocessors, electronic devices, or computers or combinations thereof designed to perform the functions described in the present disclosure.

Hereinafter, a fuel reforming system of a diesel vehicle according to an example of the present disclosure will be described in detail with reference to the accompanying drawings.

FIG. 1 shows an example of a schematic configuration of a fuel reforming system for a diesel vehicle according to an example of the present disclosure.

Referring to FIG. 1, the fuel reforming system of a diesel vehicle of the present disclosure may include a diesel engine 10, to which intake air is supplied and a diesel fuel is supplied, and an exhaust gas recirculation device (EGR) 20 that recirculates at least a portion of exhaust gas (e.g., NOx, $CO_2$, or residual hydrocarbons, etc.) from the diesel engine 10 back to the diesel engine 10. It may include a diesel reformer 30 (a reforming circuit) that receives diesel fuel and the exhaust gas exhausted from the exhaust gas recirculation device 20 and reforms the diesel fuel.

[Diesel Reformer]

The diesel reformer 30 (a reforming circuit) may supply hydrogen and a hydrogen mixture gas that are obtained by reforming a source gas including diesel fuel and water vapor through a diesel reforming reaction (e.g., diesel steam reforming, water gas shift reaction, or partial oxidation, etc.).

The diesel reformer 30 may include a reformer 310 (a diesel steam reformer (DSR)), a transformer 320 (a water gas shifter (WGS)), and a pressure swing adsorber (PSA) 330, for example, each configured to sequentially process and purify gas mixtures.

In an example of the present disclosure, 'diesel' refers to a fuel oil that may be used as a fuel for a diesel vehicle, and may include diesel, kerosene, synthetic oil, bunker seed oil, or Fischer-Tropsch fuel, etc.

The reformer 310 may generate a first mixture gas containing hydrogen through a reforming reaction under a high-temperature and high-pressure condition (e.g., above 600° C. and several atmospheres of pressure, etc.). A reaction equation of the reforming reaction, in which the diesel fuel and water react with each other in the reformer 310 to generate a first mixture gas is as follows.

[Reaction Formula 1]

$$CxHy + xH2O = xCO + (x + 0.5y)H2$$

The reforming reaction of diesel fuel and water described in Reaction Formula 1 is a strong endothermic reaction (e.g., requiring continuous heat input to sustain the forward conversion). Accordingly, because a forward reaction actively occurs under high temperature conditions, a heating device 311, such as an electric heater or a burner (e.g., resistive heating element, fuel-fired burner, or catalytic heater, etc.), which supplies reaction heat to the reformer 310, is used.

The heating device 311 may supply reaction heat by burning off gas (e.g., hydrogen-depleted $CO_2$-rich gas) that is discharged from the PSA 330.

Referring to Reaction Formula 1, a first mixture gas, produced by reforming the diesel fuel and the water, may include, for example, hydrogen, carbon monoxide, or other intermediate gases, etc. The first mixture gas may be cooled by exchanging heat with the water in the first heat exchanger 50, and then may be supplied to the transformer 320 for further conversion.

The transformer 320 may receive the first mixture gas to generate a second mixture gas that is obtained by removing carbon monoxide. Because carbon monoxide is used as a catalyst poison in downstream processes (e.g., fuel cells, reforming catalysts, or purification units, etc.) for the diesel fuel, a process of removing carbon monoxide may be used. In general, the reaction for removing carbon monoxide uses an aqueous transition reaction (e.g., water gas shift reaction) as illustrated in Reaction Formula 2 below.

[Reaction Formula 2]

$$CO + H2O = CO2 + H2$$

Referring to Reaction Formula 2, the second mixture gas may contain carbon dioxide and hydrogen as main components (e.g., 20-75% $H_2$ depending on conditions). The second mixture gas is cooled and then, supplied to the PSA 330.

The PSA 330 passes via a pressure circulation process to separate hydrogen and carbon dioxide from the produced second mixture gas. The pressure circulation process proceeds as an adsorption process, a regeneration process, a discharge process, and a pressurization process, and high-purity refined hydrogen is obtained by separating residual water using a water separator 340 that will be described later is produced.

Hydrogen may be refined and separated from the second mixture gas, and the off gas containing carbon dioxide may be discharged. The off gas may be defined as gas components other than hydrogen in the second mixture gas (e.g., $CO_2$, $CH_4$, or unreacted CO, etc.), and may be burned in the heating device 311. Hydrogen refined by the PSA 330 may be supplied to a source of demand, for example, the diesel engine 10, and may be used as a fuel.

A water supply device 40 may perform a function of supplying water to the reforming system. The water may be pure water or ultra-pure water (e.g., deionized, distilled, or reverse osmosis water, etc.) used in the reforming reaction. The water supply device 40 may be provided with a pump (not illustrated) that determines a total flow rate of discharged water.

A second heat exchanger 51 may be provided between the water supply device 40 and the first heat exchanger 50. For example, the heat exchanger may include a combination of first and second heat exchangers 50 and 51 configured to manage the thermal profile of the supplied water.

The first heat exchanger 50 may be provided between the reformer 310 and the transformer 320. A cooling medium of the first heat exchanger 50 is water that is supplied from the water supply device 40. The first mixture gas and the second mixture gas may be cooled by exchanging heat with the water in the first heat exchanger 50. The first heat exchanger 50 may be connected to the water supply device 40 to receive water, and the water that has passed through the first heat exchanger 50 may be supplied to the reformer 310 and utilized for the reforming reaction (e.g., as a reactant in steam reforming, heat sink, or carrier medium, etc.).

The first heat exchanger 50 may be provided between the reformer 310 and the transformer 320 to cool the first mixture gas through heat exchange between the first mixture gas and the water. Furthermore, the second heat exchanger 51 may be provided between the water supply device 40 and the first heat exchanger 50 so that the water that flows to the first heat exchanger 50 may be cooled through heat exchange with the exhaust gas (e.g., engine exhaust, burner exhaust, or off-gas, etc.).

A water separator 340 that separates the water from the second mixture gas that has passed through the transformer 320 may be provided between the transformer 320 and the PSA 330. The water separated by the water separator 340 may be stored in a tank (not illustrated) or discharged to the outside via a drainage path, valve, or collection system, etc. In the transformer 320, the water separator 340 may be provided with a cooler 500 for lowering a temperature of the flowing water prior to PSA processing.

Figure 2:
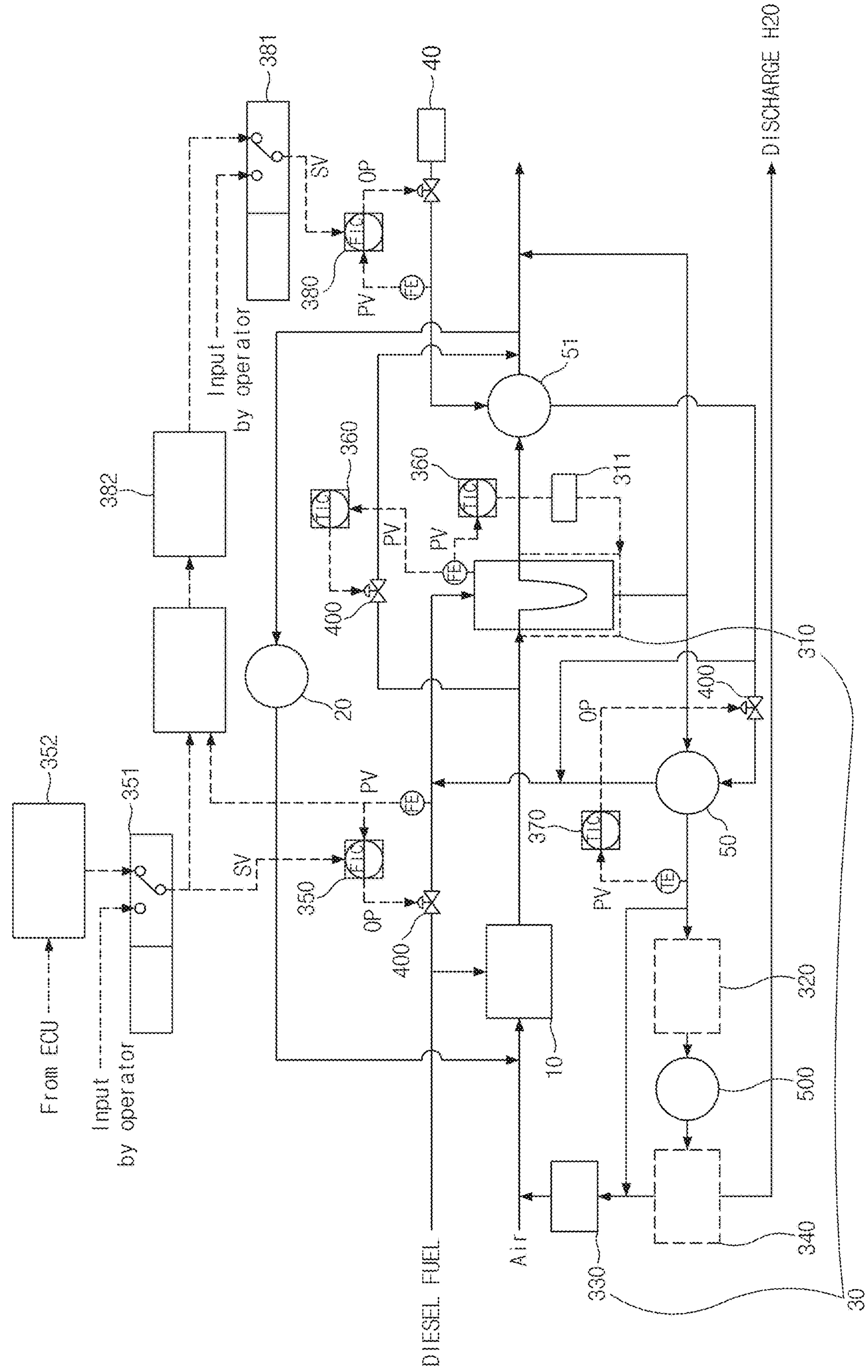
FIG. 2 shows an example of a state, in which controllers are added to FIG. 1.

FIG. 2 shows an example of a state, in which controllers 350 to 380 are configured to control the flow rates of the diesel fuel supplied to the diesel reformer 30 and the flow rates of the water and the hydrogen generated by the diesel reformer 30 in FIG. 1.

Figure 3:
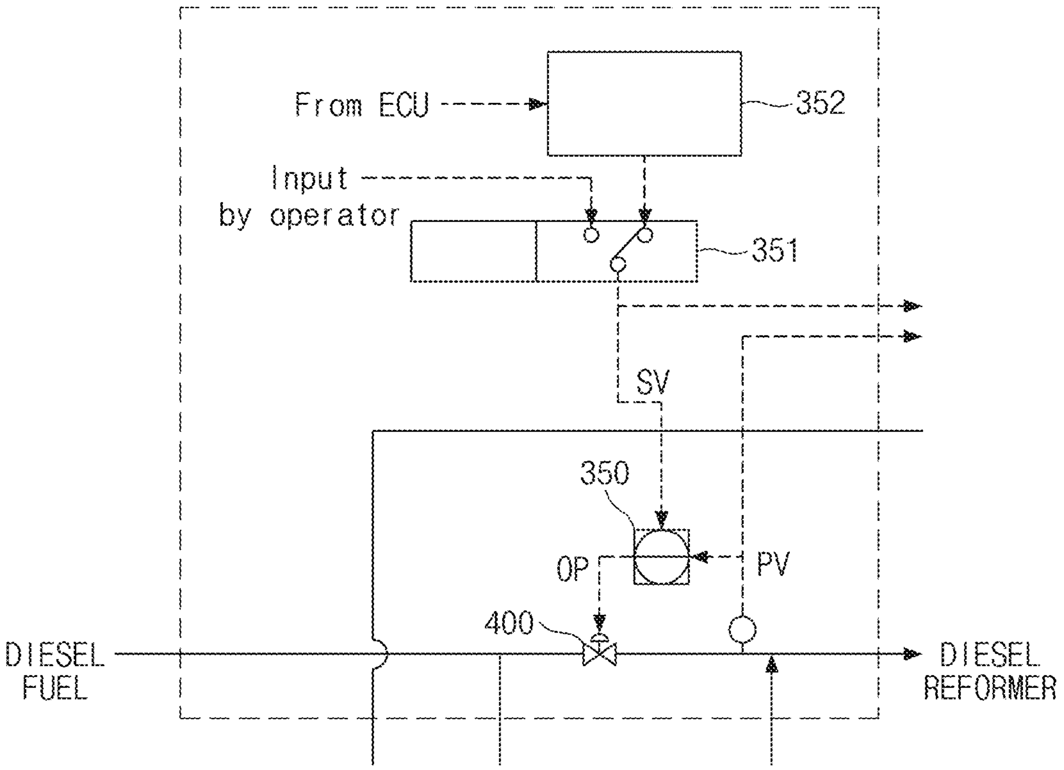
FIG. 3 shows an example of a diesel fuel flow rate controller of FIG. 2.
Figure 4:
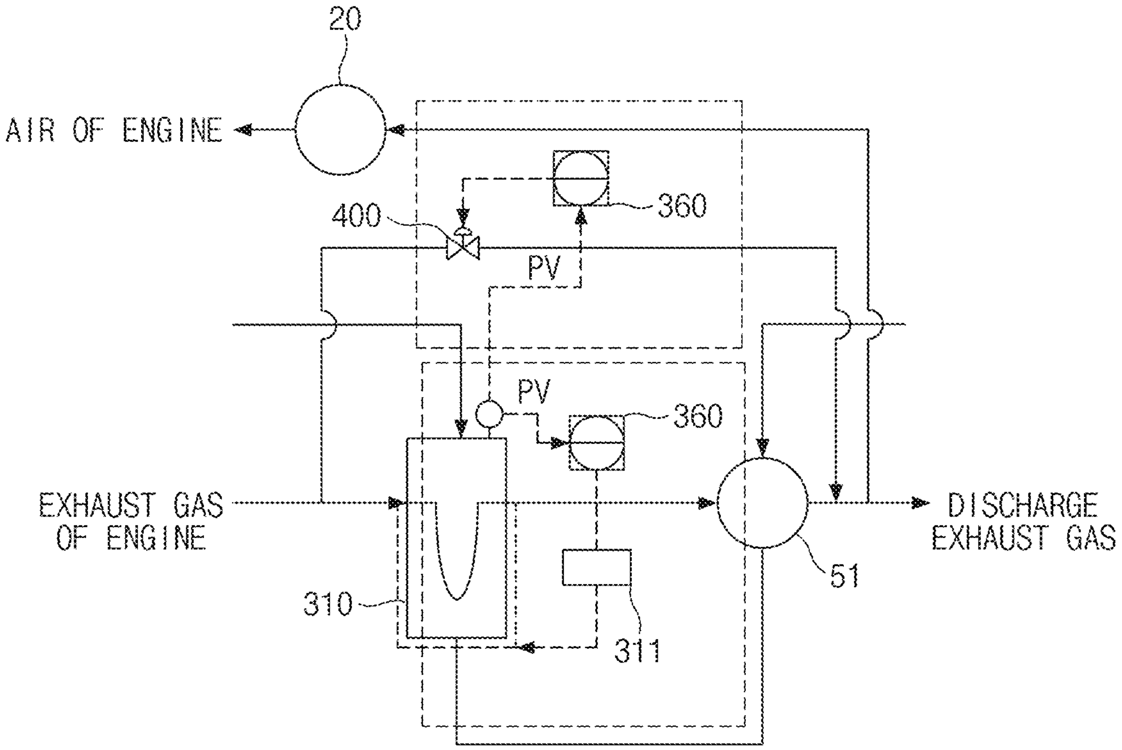
FIG. 4 shows an example of a reformer temperature controller of FIG. 2.
Figure 5:
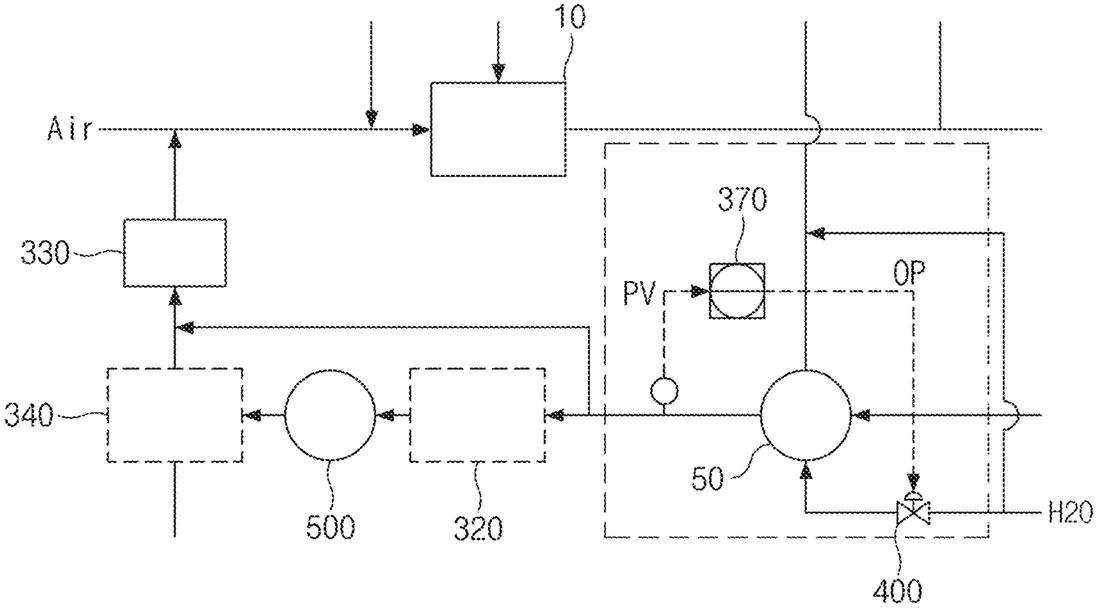
FIG. 5 shows an example of a transformer temperature controller of FIG. 2.
Figure 6:
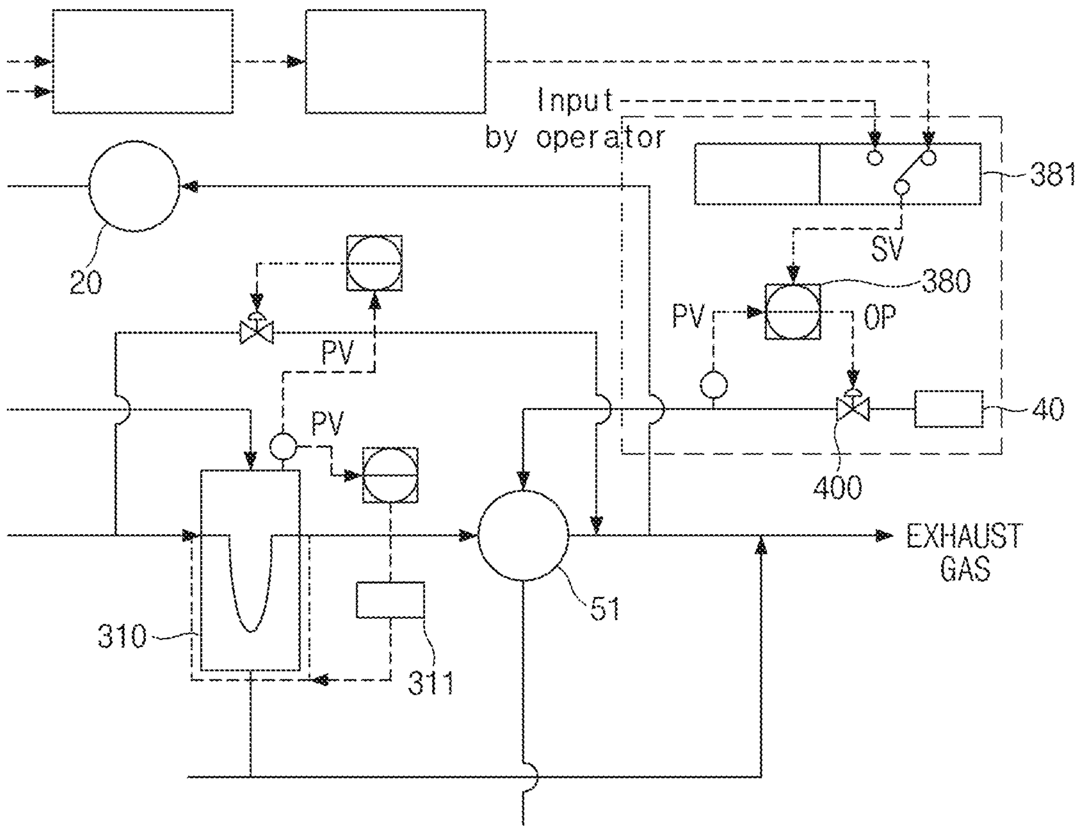
FIG. 6 shows an example of a water flow rate controller of FIG. 2.

Furthermore, FIG. 3 shows an example of a diesel fuel flow rate controller 350 of FIG. 2, FIG. 4 shows an example of a reformer temperature controller 360 of FIG. 2, FIG. 5 shows an example of a transformer temperature controller 370 of FIG. 2, and FIG. 6 shows an example of a water flow rate controller 380 of FIG. 2, each corresponding to a specific stage of the fuel reforming control process (e.g., fuel feed, heat management, or water dosing, etc.).

[Controller]

The fuel reforming system configured as in FIG. 1 may include a diesel fuel flow rate controller 350 that controls an amount of the diesel fuel supplied to the fuel reforming system, which is used by the diesel engine 10, based on engine demand or preset criteria.

As illustrated in FIG. 3, the diesel fuel flow rate controller 350 is provided with a first mode selector 351 that is configured to select whether to manually or automatically input the flow rate of the diesel fuel that is currently being introduced into the diesel engine 10. The first mode selector 351 may be implemented by an electronic controller or the like having a switching function (e.g., toggle switch, graphical UI, or rotary dial, etc.).

The manual mode selected by the first mode selector 351 is mainly used in special cases, such as maintenance, calibration, or system override, and the operator may directly input the flow rate of the diesel fuel manually using an input interface.

In the automatic mode selected in the first mode selector 351, information related to the flow rate and a load condition of the diesel fuel that is currently being introduced into the diesel engine 10 may be received via sensor data or communication interfaces (e.g., the engine control unit (ECU)). Based on the received information and the load condition, the flow rate of diesel fuel may be calculated by the diesel fuel flow rate calculator 352 and assigned as a target value (an SV value).

In this way, according to the calculation result of the diesel fuel flow rate calculator 352, the diesel fuel flow rate controller 350 may control the flow rate of the diesel fuel, for example, to maintain desired reforming efficiency or hydrogen production targets.

The diesel fuel having the flow rate that has been adjusted as described above may be supplied to the reformer 310 for example, for subsequent chemical processing (e.g., steam reforming or partial oxidation, etc.).

For reference, in the attached drawings, a flow element (FE) represents a flow rate measurement element, such as a flow rate meter, which measures the flow rate of diesel fuel, a temperature element (TE) represents a temperature measurement element, such as a temperature sensor, which measures the temperature of the first mixture gas containing hydrogen, and a flow indicator controller (FIC) represents a flow rate controller, and a temperature indicator controller (TIC) represents a temperature controller (e.g., PID controller, proportional valve driver, or digital logic unit, etc.).

Furthermore, a set point variable (SV) represents a target value that is the target of control, a process variable (PV) represents a measured current value, and an output (OP) represents an output value (e.g., a control signal to a valve actuator or pump speed adjustment, etc.).

Here, the target value (SV) may be set in advance by the operator or may be automatically set by the diesel fuel flow rate calculator 352, for example, based on engine performance models or lookup tables.

The diesel fuel and the water supplied to the reformer 310 undergo a catalytic reforming reaction to produce a first mixture gas, and heat may be supplied to the reformer 310 by the heat of the exhaust gas discharged from the diesel engine 10 and the heating device 311 (e.g., electric heater or burner, etc.).

Meanwhile, a reformer temperature controller 360 that determines whether a temperature of exhaust gas supplied to the reformer is within a normal operating range (e.g., 500° C. to 750° C. during steady-state, or 600° C. to 700° C. during active reforming, etc.) to control the temperature in respective states may be provided in the reformer 310.

As illustrated in FIG. 4, because only the heat of the exhaust gas of the diesel engine 10 may not be sufficient to meet the heat that is used for an operation of the reformer 310 if the temperature of the exhaust gas supplied to the reformer 310 is in a normal state, for example, in a normal state, in which the temperature of the exhaust gas discharged from the diesel engine 10 is within a general set temperature range (e.g., approximately 500° C. to 700° C. depending on load and catalyst type, etc.), the reformer temperature controller 360 may perform a control to raise an internal temperature of the reformer 310 by using a heating device 311, such as an electric heater or a burner (e.g., resistive coil heater, fuel-fired micro burner, or catalytic combustor, etc.).

On the other hand, in an abnormal state, in which the temperature of the exhaust gas discharged from the diesel engine 10 is rapidly raised and deviates from a preset temperature range, for example, if the internal temperature of the reformer 310 is abnormally raised by the heat of the exhaust gas discharged from the diesel engine 10 (e.g., exceeding 750° C. due to engine overshoot or malfunction, etc.), the exhaust gas is compulsorily discharged (e.g., through a bypass valve or relief path) to lower the internal temperature of the reformer 310. In this way, the internal temperature of the reformer 310 may be controlled by using the reformer temperature controller 360.

A transformer temperature controller 370 that controls the temperature of the second mixture gas generated by the transformer 320 by adjusting the flow rate of the water supplied from the water supply device 40 to the transformer 320 may be provided, for example, to maintain optimal shift reaction efficiency (e.g., at 250° C. to 400° C. for high- or low-temperature shift catalysts, etc.).

As illustrated in FIG. 5, the transformer temperature controller 370 may control the internal temperature of the transformer 320 by adjusting the flow rate of the water before the water supplied from the water supply device 40 is supplied to the transformer 320 via the first heat exchanger 50 (e.g., by modulating valve position, pump speed, or flow restrictor setting, etc.).

Furthermore, the water supply line of the water supply device 40 may be provided with a water flow rate controller 380 that controls the flow rate of the water supplied to the diesel reformer 30, for example, to ensure an optimal steam-to-carbon ratio for reforming (e.g., 2.5:1 to 4.0:1, etc.).

As illustrated in FIG. 6, the water flow rate controller 380 is provided with a second mode selector 381 that is configured to select whether to manually or automatically input a desired flow rate of the water that is currently being introduced to the diesel reformer 30. The second mode selector 381 may be implemented by an electronic controller or the like having a switching function (e.g., touchscreen interface, rotary dial, or DIP switch, etc.).

The manual mode selected by the second mode selector 381 is mainly used in special cases, such as maintenance, emergency override, or calibration, and the operator may directly input the flow rate of the water using a manual control panel or dedicated manual input interface.

In the automatic mode selected in the second mode selector 381, the water flow rate may be calculated by selecting a higher value (e.g., to avoid fuel-rich conditions and prevent coking), among the target value (SV) and the measured value (PV) after calculating the flow rate of the water from a water flow rate calculator 382 based on the amount of the diesel fuel supplied to the diesel reformer 30.

In this way, the water flow rate controller 380 may control the flow rate of the water depending on the calculation result of the water flow rate calculator 382, for example, to maintain thermal balance and reaction completeness.

Int this way, the water having the flow rate adjusted in this way may be supplied to the diesel reformer 30 through the second heat exchanger 51, for example, to regulate inlet temperature and support efficient endothermic reforming.

Figure 7:
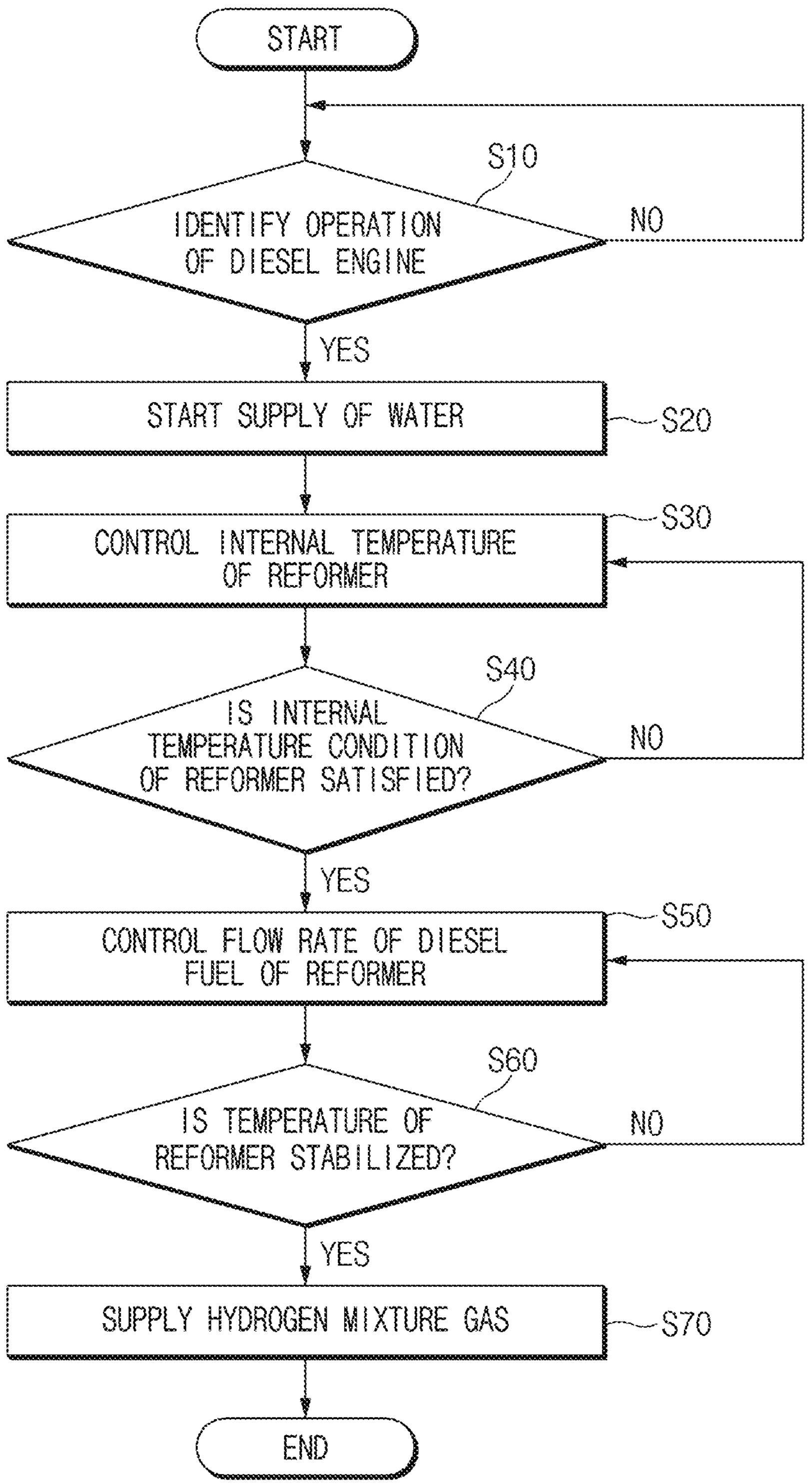
FIG. 7 shows an example of a control flow of a fuel reforming system of a diesel vehicle according to an example of the present disclosure.

FIG. 7 shows an example of a control flow of a fuel reforming system of a diesel vehicle according to an example of the present disclosure, which outlines stepwise operation and temperature-flow coordination.

Referring to FIG. 7, an operation of the diesel engine 10 is identified (S10), and water is supplied to the diesel reformer 30 through the water supply device 40 to begin humidification and thermal ramp-up (S20).

Through the transformer temperature controller 370 and the water flow rate controller 380, the temperature of an interior of the diesel reformer 30 is controlled by controlling the flow rate of the water supplied to the diesel reformer 30 (S30).

In this way, when an internal temperature of the diesel reformer 30 is controlled, an internal temperature condition of the diesel reformer 30 is satisfied (e.g., meeting minimum reforming temperature thresholds such as 600° C. or more) (S40).

A diesel fuel is supplied to the diesel reformer 30 and a flow rate of the diesel fuel is controlled through the diesel fuel flow rate controller 350 (S50).

In this way, when the flow rate is adjusted by supplying the diesel fuel to the diesel reformer 30, a temperature of the diesel reformer 30 is stabilized to initiate or sustain hydrogen generation (S60).

A mixed gas containing hydrogen may be supplied to the diesel engine 10 from the diesel reformer 30 having a stabilized temperature to assist combustion or supplement fuel efficiency.

This step is a method for controlling the fuel reforming system, and according to the fuel reforming system of a diesel vehicle according to the present disclosure, the flow rates of the diesel fuel and the water supplied to the diesel reformer 30 and the temperature of the interior of the diesel reformer 30 are stably maintained, and the amount of hydrogen supplied to the diesel engine 10 through the diesel reformer 30 is increased, so that the amount of nitrogen oxides (NOx) and particulate matter (PM) discharged from the diesel engine 10 may be reduced. Thus, exhaust gas performance may be improved (e.g., by lowering thermal NOx formation, improving combustion completeness, or enabling leaner operation, etc.).

Meanwhile, reference numeral 400 unexplained denotes a flow rate control valve that controls the flow rates of the diesel fuel controlled by the diesel fuel flow rate controller 350, the water flow rate controller 380, the reformer temperature controller 360, and the water flow rate controller 370, as well as the flow rate of the exhaust gas, the flow rate of the water, and the internal temperature of the diesel reformer 30 via coordinated actuation (e.g., feedback-regulated valves, electropneumatic actuators, or proportional solenoid valves, etc.).

Figure 8:
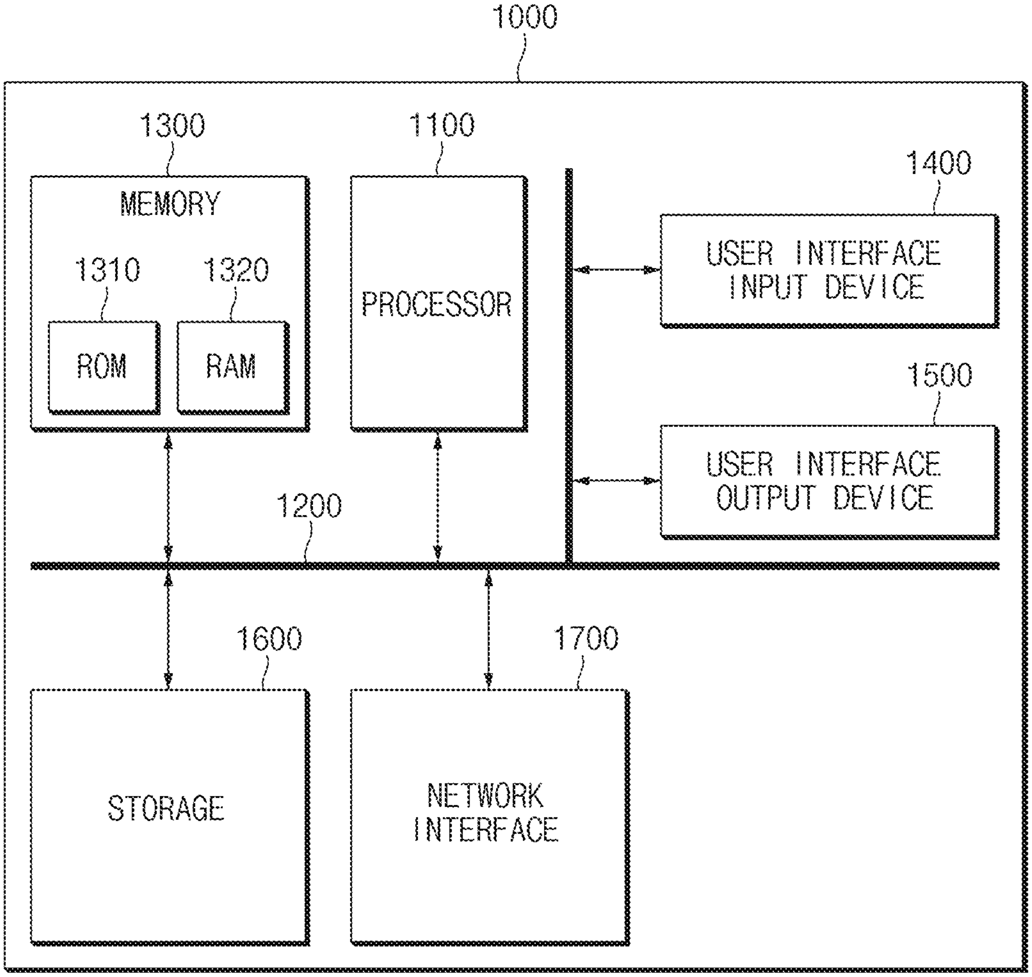
FIG. 8 shows an example computing system (e.g., a computing device of a vehicle or any other apparatus).

FIG. 8 shows an example computing system (e.g., a computing device of a vehicle or any other apparatus). One or more controllers, processors, etc. described herein, such as one or more components of a diesel vehicle, one or more components a fuel reforming system, one or more components of controllers, and any other components and devices disclosed herein, may be implemented by or in the computing system as shown in FIG. 8.

A computing system 1000 may include at least one processor 1100, memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read-only memory (ROM) and a random-access memory (RAM).

Communication interface (s) (also referred to as communication device(s), communicator(s), communication module(s), communication unit(s), etc.), such as the network interface 1700, may allow software and/or data to be transferred between a device and one or more external devices, and/or between one or more components of a device. Communication interface (s) may include a receiver, a transmitter, a transceiver, a modem, a network interface and/or adapter (such as an Ethernet adapter), a radio transceiver, an antenna, a communication port, a Personal Computer Memory Card International Association (PCMCIA) slot and card, or the like. Software and data transferred via communication interface(s) may be in the form of signals, which may be electronic, electromagnetic, optical, infrared, or other signals capable of being received by communication interface(s). These signals may be provided to communication interface(s) via a communication path of a device, which may be implemented using, for example, wire or cable, fiber optics, a cellular link, a radio frequency (RF) link and/or other communications channels. Communication interface(s) may communicate using one or more communication protocols, such as Ethernet, Wi-Fi, near-field communication (NFC), Infrared Data Association (IrDA), Bluetooth, Bluetooth low energy (BLE), Zigbee, Long-Term Evolution (LTE), 5G New Radio (NR), vehicle-to-everything (V2X), a controller area network (CAN), or a local interconnect network (LIN), etc.

Accordingly, the operations of the method or algorithm described in connection with example embodiment(s) disclosed in the specification may be directly implemented with a hardware module, a software module, or a combination of the hardware module and the software module, which is executed by the processor 1100. The software module may reside on a storage medium (e.g., the memory 1300 and/or the storage 1600) such as RAM, a flash memory, ROM, an erasable and programmable ROM (EPROM), an electrically EPROM (EEPROM), a register, a hard disk drive, a removable disc, or a compact disc-ROM (CD-ROM)).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

An example of the present disclosure provides a fuel reforming system of a diesel vehicle, by which an emission performance may be improved by supplying hydrogen or a hydrogen mixture gas to a diesel engine through a diesel reformer to reduce amounts of nitrogen oxides and particulate matters that are discharged.

An example of the present disclosure also provides a fuel reforming system of a diesel vehicle, by which an amount of hydrogen that is suppled to a diesel engine may be improved by controlling flow rates of a diesel fuel and water and an internal temperature of a diesel reformer to stably maintain a temperature of an interior of the diesel reformer.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a fuel reforming system of a diesel vehicle includes a diesel reformer including a reformer that reforms a source gas including a diesel fuel and vapor into a first mixture gas containing hydrogen through a diesel reforming reaction, a transformer (WGS) that receives the first mixture gas of the reformer and generate a second mixture gas obtained by removing carbon dioxide through an aqueous transition reaction, and a PSA that refines hydrogen in the second mixture gas generated by the transformer and discharge the hydrogen to a diesel engine, a first heat exchanger provided between the reformer and the transformer, and that controls temperatures of the first and second mixture gases through heat exchange with water, and a water supply device connected to the first heat exchanger to supply water, and that supply the water having passed through the first heat exchanger to the reformer, and the fuel reforming system further includes a controller that controls flow rates of the diesel fuel and the water, and an internal temperature of the diesel reformer.

According to an example of the present disclosure, the fuel reforming system may further include a heating device that supplies reaction heat to the reformer.

According to an example of the present disclosure, the fuel reforming system may further include a water separator provided between the transformer and the PSA, and that separates the water from the second mixture gas having passed through the transformer.

According to an example of the present disclosure, the fuel reforming system may further include a second heat exchanger provided between the water supply device and the first heat exchanger, and that lowers a temperature of the water flowing to the first heat exchanger.

According to an example of the present disclosure, the fuel reforming system may further include a cooler provided between the transformer and the water separator, and that lowers a temperature of the flowing water.

According to an example of the present disclosure, the controller may include a diesel fuel flow rate controller that controls an amount of the supplied diesel fuel used by the diesel engine, a reformer temperature controller that determines whether a temperature of exhaust gas supplied to the reformer is normal to control the temperature in respective states, a transformer temperature controller that controls a temperature of the second mixture gas generated by the transformer by adjusting a flow rate of the water supplied from the water supply device to the transformer, and a water flow rate controller that controls the flow rate of the water supplied to the diesel reformer.

According to an example of the present disclosure, the diesel fuel flow rate controller may include a first mode selector that selects an input mode for a flow rate of the diesel fuel, and a diesel fuel flow rate calculator that calculates the flow rate of the diesel fuel depending on information related to the flow rate of the diesel fuel from an engine control unit (ECU) if the input method selected by the first mode selector is an automatic mode.

According to an example of the present disclosure, the reformer temperature controller may raise an internal temperature of the reformer if the temperature of the exhaust gas supplied to the reformer is in a normal state, and may compulsorily discharge the exhaust gas in an abnormal state, in which the temperature of the exhaust gas supplied to the reformer is raised and deviates from a set temperature.

According to an example of the present disclosure, the water flow rate controller may include a second mode selector that selects an input mode for the flow rate of the water, and a water flow rate calculator that calculates the flow rate of the water based on an amount of the diesel fuel supplied to the diesel reformer if the input method selected by the second mode selector is an automatic mode.

According to an example of the present disclosure, the controller may include a flow rate control valve that controls flow rates of the diesel fuel, the exhaust gas, and the water.

According to the fuel reforming system of a diesel vehicle according to the present disclosure having the above-described configuration, an emission performance may be improved by supplying hydrogen or a hydrogen mixture gas to the diesel engine through the diesel reformer to reduce amounts of nitrogen oxides and particulate matters that are discharged.

In addition, an amount of hydrogen that is supplied to the diesel engine may be improved by controlling flow rates of the diesel fuel and the water and an internal temperature of the diesel reformer to stably maintain a temperature of the mixture gas containing hydrogen in the interior of the diesel reformer.

The above-mentioned description of the present disclosure is intended to be illustrative, and it should be understood by those skilled in the art that the present disclosure may be embodied in other specific forms without departing from the spirit or essential characteristics thereof. Therefore, the above-described examples are examples in all examples, and should be construed not to be restrictive. The scope of the present disclosure is defined by claims to be described below, and it should be interpreted that the scopes or claims of the present disclosure and all modifications or changed forms derived from the equivalent concept are included in the scopes of the present disclosure.

What is claimed:

1. An apparatus of a vehicle, the apparatus comprising:

a gas reformer configured to reform, through a diesel reforming reaction, a source gas into a first mixture gas containing hydrogen, wherein the source gas comprises a diesel fuel and vapor;

a water gas shift reactor configured to, based on the first mixture gas, generate a second mixture gas by converting carbon monoxide in the first mixture gas into carbon dioxide through an aqueous transition reaction, and a pressure swing adsorber (PSA) configured to refine hydrogen in the second mixture gas and discharge the refined hydrogen to a diesel engine of the vehicle;

a first heat exchanger configured to control a temperature of the first mixture gas and a temperature of the second mixture gas through heat exchange with water, wherein the first heat exchanger is provided between the gas reformer and the water gas shift reactor;

a water supply device, connected to the first heat exchanger to supply water, and configured to supply water having passed through the first heat exchanger to the gas reformer; and a control circuit configured to control:

a flow rate of the diesel fuel supplied to the gas reformer, a flow rate of the water supplied from the water supply device through the first heat exchanger, and an internal temperature of the gas reformer.

2. The apparatus of claim 1, further comprising:

a heating device configured to supply reaction heat to the gas reformer.

3. The apparatus of claim 1, further comprising:

a water separator, provided between the water gas shift reactor and the PSA, and configured to separate the water from the second mixture gas having passed through the water gas shift reactor.

4. The apparatus of claim 3, further comprising:

a cooler, provided between the water gas shift reactor and the water separator, configured to lower a temperature of the second mixture gas before water is separated from the second mixture gas by the water separator.

5. The apparatus of claim 1, further comprising:

a second heat exchanger, provided between the water supply device and the first heat exchanger, configured to lower a temperature of the water flowing to the first heat exchanger.

6. The apparatus of claim 1, wherein the control circuit is further configured to:

control an amount of diesel fuel required by the diesel engine;

control the internal temperature of the gas reformer based on whether a temperature of exhaust gas supplied to the gas reformer is within a preset operating range;

control a temperature of the second mixture gas by adjusting a flow rate of the water supplied from the water supply device to the water gas shift reactor; and control a flow rate of water supplied to the gas reformer.

7. The apparatus of claim 6, wherein the control circuit is further configured to:

select an input mode for controlling a flow rate of the diesel fuel; and based on a selected input mode being an automatic mode and information related to the flow rate of the diesel fuel from an engine control circuit of the vehicle, determine the flow rate of the diesel fuel.

8. The apparatus of claim 6, wherein the control circuit is further configured to:

based on the temperature of exhaust gas supplied to the gas reformer being within the preset operating range, raise an internal temperature of the gas reformer; and based on the temperature of exhaust gas supplied to the gas reformer being outside the preset operating range, discharge the exhaust gas from the gas reformer.

9. The apparatus of claim 6, wherein the control circuit is further configured to:

select an input mode for controlling the flow rate of the water; and based on a selected input mode being an automatic mode and an amount of the diesel fuel supplied to the gas reformer, determine the flow rate of the water.

10. The apparatus of claim 6, wherein the control circuit is further configured to control a flow rate of the exhaust gas supplied to the gas reformer.

11. An apparatus of a vehicle, the apparatus comprising:

a processor; and a memory storing at least one instruction that, when executed by the processor communicating with the memory, is configured to cause the apparatus to:

control, based on an operating state of an engine of the vehicle, a flow rate of fuel for the engine;

control, based on the flow rate of the fuel, a flow rate of water;

adjust, based on the controlled flow rate of the fuel and the controlled flow rate of the water, a temperature of the diesel fuel and a temperature of the water;

generate a hydrogen-containing gas by reforming the temperature-adjusted fuel and the temperature-adjusted water; and supply the generated hydrogen-containing gas to the engine of the vehicle.

12. The apparatus of claim 11, wherein the at least one instruction, when executed by the processor communicating with the memory, is configured to cause the apparatus to control, based on a fuel amount corresponding to the operating state of the engine, the flow rate of the fuel in an automatic mode.

13. The apparatus of claim 11, wherein the at least one instruction, when executed by the processor communicating with the memory, is configured to cause the apparatus to control, based on an operator input, the flow rate of the fuel in a manual mode.

14. The apparatus of claim 11, wherein the at least one instruction, when executed by the processor communicating with the memory, is configured to cause the apparatus to determine the flow rate of the water based on the flow rate of the fuel, and wherein the flow rate of the water is determined as a greater value between a predetermined setpoint value and a measured process variable value.

15. The apparatus of claim 11, wherein the at least one instruction, when executed by the processor communicating with the memory, is configured to cause the apparatus to, based on a temperature of exhaust gas supplied for the reforming being within a predetermined range, adjust the temperature of the diesel fuel and the temperature of the water by activating a heating device to increase the temperature of the fuel and the temperature of the water.

16. The apparatus of claim 11, wherein the at least one instruction, when executed by the processor communicating with the memory, is configured to cause the apparatus, based on a temperature of exhaust gas supplied to the gas reformer exceeding a predetermined range, to adjust the temperature of the fuel and the temperature of the water by discharging the exhaust gas through a bypass path of the engine.

17. The apparatus of claim 11, wherein the at least one instruction, when executed by the processor communicating with the memory, is configured to cause the apparatus to generate the hydrogen-containing gas by performing a water gas shift reaction after performing a steam reforming reaction.

18. The apparatus of claim 11, wherein the at least one instruction, when executed by the processor communicating with the memory, is configured to cause the apparatus to cool, via a heat exchanger, the water before the water is supplied for the reforming.

19. The apparatus of claim 11, wherein the at least one instruction, when executed by the processor communicating with the memory, is configured to cause the apparatus to purify the hydrogen-containing gas by separating water and carbon dioxide from the hydrogen-containing gas using pressure swing adsorption.

20. The apparatus of claim 11, wherein the at least one instruction, when executed by the processor communicating with the memory, is configured to cause the apparatus to control, via a heat exchange using a reforming byproduct gas, a temperature of the water before the water is supplied for the reforming.

* * * * *